United States Patent [19]

Terae et al.

[11] Patent Number: 4,900,474

[45] Date of Patent: Feb. 13, 1990

[54] SILICONE ANTIFOAMERS

[75] Inventors: Nobuyuki Terae; Teiichi Mutoh, both of Annaka; Akira Yoshida, Tokyo, all of Japan

[73] Assignee: Shin-Etsu Chemical Co., Ltd., Tokyo, Japan

[21] Appl. No.: 219,400

[22] Filed: Jul. 15, 1988

[30] Foreign Application Priority Data

Jul. 17, 1988 [JP] Japan ................................. 62-177082

[51] Int. Cl.$^4$ ............................................. B01D 19/04
[52] U.S. Cl. .................................... 252/358; 556/416; 556/419; 556/420; 556/423; 556/445; 252/321
[58] Field of Search ............... 556/448, 445, 419, 420, 556/423, 416; 252/351, 352, 350, 356

[56] References Cited

U.S. PATENT DOCUMENTS

| | | | |
|---|---|---|---|
| 2,917,480 | 12/1959 | Bailey et al. | 252/351 |
| 3,398,172 | 8/1968 | Damm et al. | 252/357 |
| 3,524,003 | 9/1970 | Rausch et al. | 556/448 |

FOREIGN PATENT DOCUMENTS

| | | | |
|---|---|---|---|
| 0167597 | 10/1983 | Japan | 556/419 |
| 3250389 | 10/1988 | Japan | 556/448 |

*Primary Examiner*—John Doll
*Assistant Examiner*—Stuart L. Hendrickson
*Attorney, Agent, or Firm*—Birch, Stewart, Kolasch & Birch

[57] ABSTRACT

An antifoamer which comprises a polyperfluoroether group-containing organopolysiloxane comprising from 20 to 100 mole % of the polyperfluoroether group-containing organopolysiloxane units of a specific type is described. The content of fluorine atoms in the polyperfluoroether group-containing organopolysiloxane is in the range of from 20 to 70 wt % by which foams of organic solvent systems can be inhibited to a substantial extent.

16 Claims, No Drawings

SILICONE ANTIFOAMERS

BACKGROUND OF THE INVENTION

1. Field of the Invention

The present invention relates to antifoamers having a good antifoaming effect on organic solvent systems which are being foamed.

2. Description of the Prior Art

Various types of antifoamers including silicone antifoamers have been used in industrial processes involving foaming. The silicone antifoamers such as oil compounds obtained by mixing silicone oils including dimethylpolysiloxane, methylphenylpolysiloxane, methylvinylpolysiloxane and the like with finely powdered silica. Emulsions of these oil compounds in water along with surface active agents have been widely utilized because they have better properties and, particularly, are chemically more stable than other types of antifoamers. They are also able to exhibit good effects in small amounts.

However, these silicone antifoamers exhibit good antifoaming effects on aqueous systems but have only very small effects on organic solvent systems in which the solubility of the silicone is high. For the antifoaming of organic solvent systems, there has been proposed a method using highly viscous dimethylpolysiloxane, for example, in Japanese Patent Publication No. 35-12564. This does not necessarily exhibit satisfactory antifoaming effects. Alternatively, there have been proposed antifoamers comprising perfluoroether compounds (Japanese Patent Application Laid-open Nos. 59-22611 and 60-22907) and antifoamers for organic solvent comprising perfluoroalkyl group-containing siloxanes (Japanese Patent Publication No. 35-12564 and U.S. Pat. No. 4,329,528). However, all of these antifoamers are not necessarily satisfactory with respect to the antifoaming effect.

Accordingly, there is a demand for the development of silicone antifoamers which have good effects on the antifoaming of organic solvent systems.

SUMMARY OF THE INVENTION

It is therefore an object of the present invention to provide an antifoamer which exhibits good antifoaming or foam-inhibiting effects on organic solvent systems.

It is another object of the present invention to provide a silicone antifoamer which is comprised of a specific type of perfluoroether-group containing organopolysiloxane whereby good antifoaming effects on organic solvent systems are attained.

The above objects can be achieved, according to the invention, by an antifoamer which comprises a polyperfluoroether group-containing organopolysiloxane comprising from 20 to 100 mole % of the polyperfluoroether group-containing organosiloxane units of the following formula (1)

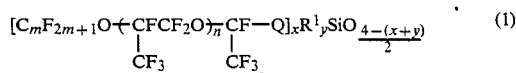 (1)

wherein Q represents a divalent organic group having from 1 to 40 carbon atoms, $R^1$ represents a hydrogen atom, a substituted or unsubstituted monovalent hydrocarbon group having from 1 to 8 carbon atoms or a —OX group in which X represents a hydrogen atom or a monovalent hydrocarbon group having from 1 to 8 carbon atoms, m is an integer of from 1 to 14, n is an integer of 1 to 10, and x and y are $0 < x \leq 3$ and $0 \leq y \leq 3$ provided that $0 < x + y \leq 3$, the content of fluorine atoms in the polyperfluoroether group-containing organopolysiloxane being in the range of from 20 to 70% by weight.

The organopolysiloxane comprising the polyperfluoroether group-containing organosiloxane unit of the above formula (1) has a small surface tension and small solubility in organic solvents, so that it can inhibit foaming of organic solvent systems. Moreover, the organopolysiloxane has good antifoaming effects on organic solvent systems in which hydrocarbon or fluorine surface active agents are dissolved.

DETAILED DESCRIPTION OF THE INVENTION

The polyperfluoroether group-containing organopolysiloxane used for an antifoamer of the invention contains the units of the following general formula (1)

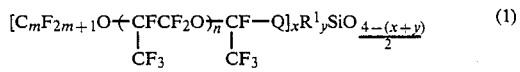 (1)

In the formula, the polyperfluoroether group is represented by the following general formula

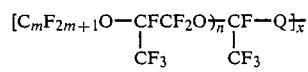

in which m is an integer of from 1 to 14, preferably from 1 to 8, and n is an integer of 1 or over, preferably from 1 to 10, more preferably from 2 to 10. In addition, Q is a divalent organic group having from 1 to 40 carbon atoms including, for example,

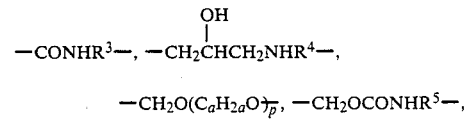

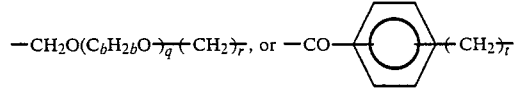

in which $R^3$, $R^4$ and $R^5$ independently represent a divalent hydrocarbon group having from 1 to 10 carbon atoms, preferably from 1 to 6 carbon atoms such as, for example, an alkylene group (a methylene group, an ethylene group, etc.), a phenylene group or the like, a and b are independently an integer of from 1 to 5, preferably from 2 to 4, p and q are independently an integer of from 1 to 10, preferably from 1 to 6, and r and t are independently an integer of from 2 to 5, preferably from 2 to 3. In the formula of the polyperfluoroether group, x is such an integer that $0 < x \leq 3$.

In the formula (1), $R^1$ is a hydrogen atom, an unsubstituted or substituted monovalent hydrocarbon group having from 1 to 8 carbon atoms, preferably from 2 to 6 carbon atoms including, for example, an alkyl group such as a methyl group, an ethyl group, a propyl group, a butyl group, an octyl group or the like, a cycloalkyl group such as a cyclohexyl group, an alkenyl group such as a vinyl group, an allyl group or the like, an aryl group such as a phenyl group, a tolyl group or the like, an aralkyl group such as a 2-phenylethyl group, and the above-identified groups in which part or all of the hydrogen atoms bonded to the carbon atoms are substituted with a halogen atom, a cyano group or the like, e.g. a chloromethyl group, a trifluoropropyl group, a cyanoethyl group and the like, or a —OX group in which X represents a hydrogen atom or a monovalent hydrocarbon group having from 1 to 8 carbon atoms, preferably from 1 to 4 carbon atoms. The example of the monovalent hydrocarbon group is the same as above. y is such an integer that $0 \leq y \leq 3$, and $0 < x+y \leq 3$.

The polyperfluoroether group-containing organosiloxane units of the formula (1) can be obtained by the reaction of a polyperfluoroether compound and a siloxane compound. The polyperfluoroether compound used for the reaction is obtained by the following sequence of reactions (I) to (VI) using an acid fluoride compound which is obtained by polymerizing hexafluoropropylene oxide in the presence of a cesium fluoride catalyst in a diglyme solvent by the use of a reaction initiator of the formula, $C_mF_{2m+1}COF$, in which m has the same meaning as defined above.

$$CF_3CF\!\!-\!\!CF_2 + CsF$$
$$\diagdown O \diagup$$

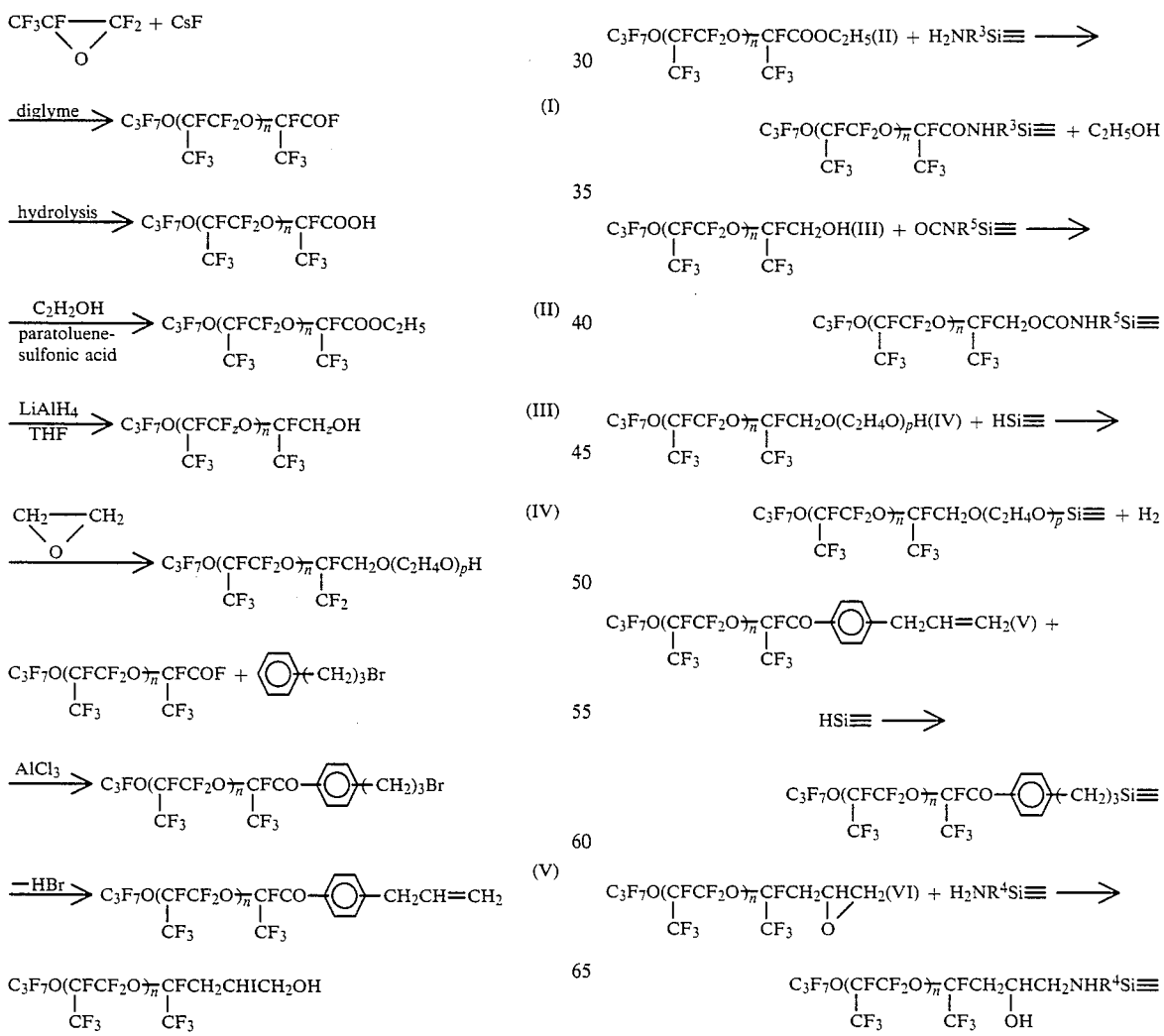

in which n and p have, respectively, the same meanings as defined before.

The siloxane compounds are obtained by hydrolysis of organosilanes such as, for example, $(H_2NR^3)R^1Si(OX)_2$, $(H_2NR^3)_2$, $H_2Si(OX)_2$, $HR^1Si(OX)_2$, $(OCNR^5)_2Si(OX)_2$ and $(OCNR^5)R^1Si(OX)_2$, in which X, $R^1$, $R^3$ and $R^5$ have, respectively, the same meanings as defined before.

For reacting the polyperfluoroether compounds (I) to (VI) obtained by the above method with siloxane compounds to obtain polyperfluoroether group-containing organosiloxane units of the formula (1), the following reaction sequence can be utilized, for example:

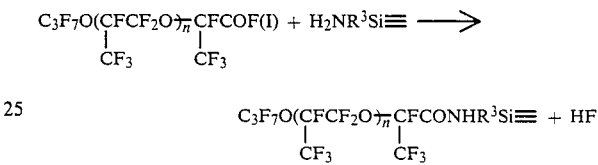

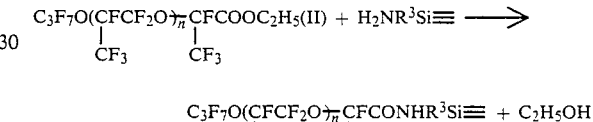

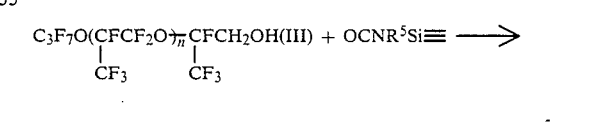

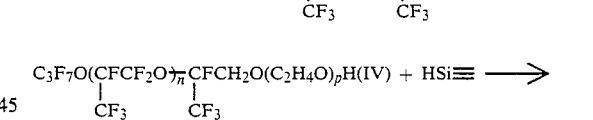

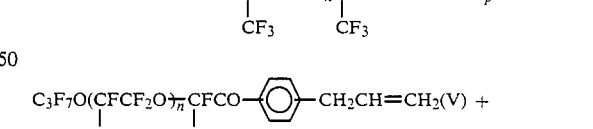

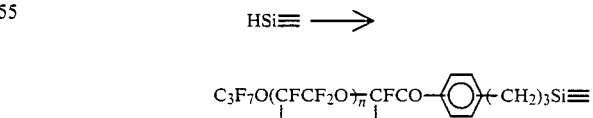

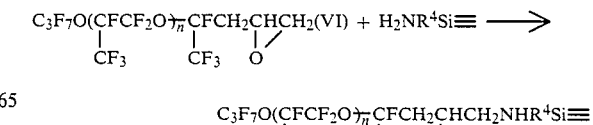

in which $R^3$, $R^4$, $R^5$, a, b and p have, respectively, the same meanings as defined before.

The content of the polyperfluoroether group-containing organosiloxane units of the general formula (1) is from 20 to 100 mole %, preferably from 30 to 70 mole %, of the polyperfluoroether group-containing organopolysiloxane used for the antifoamer of the present invention. If the content is less than 20 mole %, it is difficult to obtain the organopolysiloxane in which the content of fluorine atoms is not less than 20% by weight.

Although the antifoamer of the present invention comprises the organopolysiloxane containing from 20 to 100 mole % of the polyperfluoroether group-containing organosiloxane units of the formula (1), the organopolysiloxane may further comprise, aside from the polyperfluoroether group-containing siloxane units, from 0 to 80 mole % of other siloxane units. This siloxane unit is not critical and is preferably a siloxane unit of the following general formula (2)

$$R^2_z SiO_{\frac{4-z}{2}} \quad (2)$$

in which $R^2$ represents a hydrogen atom or a substituted or unsubstituted monovalent hydrocarbon group having from 1 to 8 carbon atoms, preferably from 1 to 4 carbon atoms, and Z is $0 < z \leq 3$. The example of the monovalent hydrocarbon group is the same as explained in $R^1$.

In order to obtain a polyperfluoroether group-containing organopolysiloxane containing the siloxane units of the general formula (2), perfluoroether group-containing organosiloxane of the general formula (1) and the organosiloxane of the general formula (2) are subjected to equilibration reaction in the presence of a siloxane serving as an end-blocking group, e.g. hexamethyldisiloxane, while controlling the contents of the respective units, thereby obtaining an intended organopolysiloxane.

The polyperfluoroether group-containing organopolysiloxane used for the antifoamer according to the present invention should have a fluorine content of from 20 to 70% by weight, preferably from 30 to 60% by weight. If the fluorine content is less than 20% by weight, the lowering of the surface tension of the organopolysiloxane is not satisfactory, so that it does not produce a satisfactory antifoaming effect on systems comprising organic solvents and/or fluorine surface active agents whose surface tension is smaller than that of the organopolysiloxane. The solubility of such an organopolysiloxane in organic solvent does not become high. Over 70% by weight, the solubility in organic solvent becomes poor. Accordingly, limitation is placed on the type of solvent which is used, as a diluent, by addition to the organopolysiloxane. The dispersability in organic solvent or the diffusivity in foams becomes poor, leading to rather unsatisfactory antifoaming effects. Particularly, good foam-breaking properties and immediate effects cannot be expected.

The antifoamer of the present invention is particularly useful in antifoaming solution containing organic solvents and particularly, hydrocarbon solvents, and fluorine surface active agents. The antifoamer may consist solely of the polyperfluoroether group-containing organopolysiloxane and added to a solution to be antifoamed. It is general to use, as an antifoamer, the organopolysiloxane dissolved in a ketone or halogen-containing organic solvent in an amount of from 2 to 50% by weight. Examples of such ketone solvent include methyl ethyl ketone, methyl isobutyl ketone and the like. Examples of the halogen-containing solvents include 1,1,2-trifluoro-1,1,2-trichloroethane, hexafluoroxylene, hexafluoropropylene oligomers, 1,1,3-trichloroethane, 1,1,2,2-tetrachloroethylene and the like. Similar to dimethylsiloxane antifoamers, finely powdered silica may be added to the antifoamer, if necessary, in order to improve the foam-breaking properties. The blending amount of silica may be less than 20 parts by weight, preferably less than 15 parts by weight to 100 parts by weight of the organopolysiloxane.

Since the antifoamer of the present invention comprises a perfluoroether group-containing organopolysiloxane which has a small surface tension and has low solubility in organic solvents, it exhibits good antifoaming effects on organic solvent systems.

The present invention is more particularly described by way of examples, which should not be construed as limiting the present invention. Comparative examples are also shown.

EXAMPLE 1

24.8 g (0.1 mole) of an organopolysiloxane of the following formula

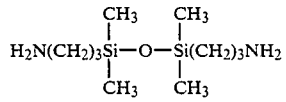

and 138.0 g (0.2 moles) of a polyperfluoroether compound of the following formula

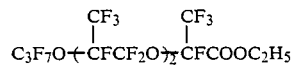

were charged into a 500 ml three-necked flask equipped with a thermometer, a cooling tube and an agitator, followed by reaction in a dried tetrahydrofuran solvent at a temperature of from 70° to 90° C. for 10 hours. Thereafter, the tetrahydrofuran was removed by stripping under a reduced pressure of 30 mmHg at 100° C., thereby obtaining a poly(perfluoropropylene glycol) group-containing organopolysiloxane of the following formula (A) as a light yellow, transparent liquid having a fluorine content of 42.1 wt %. This was provided as an antifoamer.

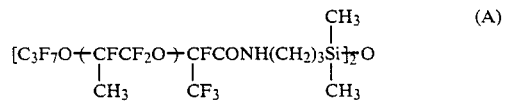

EXAMPLE 2

69.42 g (0.01 mole) of an organosiloxane of the following formula

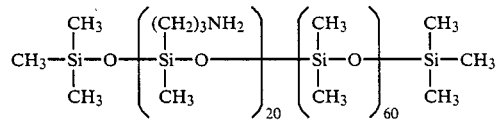

and 132.8 g (0.2 moles) of a polyperfluoroether compound of the following formula

were charged into a 500 ml three-necked flask, followed by repeating the procedure of Example 1, thereby obtaining a poly(perfluoropropylene glycol) group-containing organopolysiloxane of the following formula (B) in the form of a light yellow transparent liquid having a fluorine content of 44.1 wt %. This was used as an antifoamer.

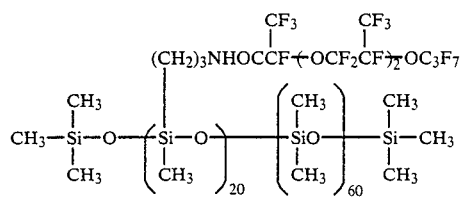

EXAMPLE 3

69.42 g (0.01 mole) of an organosiloxane as used in Example 2 and 134.2 g (0.2 moles) of a polyperfluoroether compound of the following formula

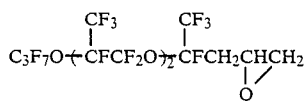

were charged into a 500 ml three-necked flask, followed by reaction under heating conditions in a methyl ethyl ketone solvent at a temperature of from 70° to 80° C. for 20 hours. Thereafter, the methyl ethyl ketone was removed by stripping under a reduced pressure of 30 mmHg at temperature of 120° C. to obtain a poly(perfluoropropylene glycol) group-containing organopolysiloxane of the following formula (C) in the form of a light yellow transparent liquid having a fluorine content of 42.8 wt %. This was provided as an antifoamer.

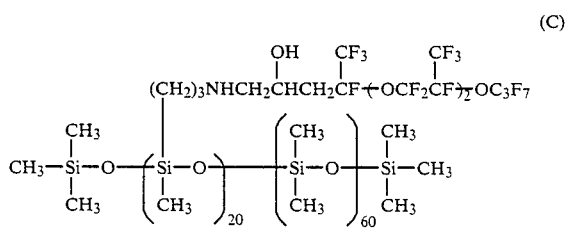

EXAMPLE 4

98.04 g (0.02 moles) of methylhydrogenpolysiloxane of the following formula

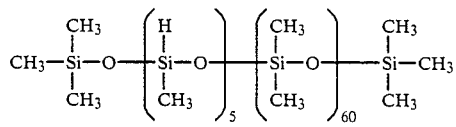

and 106.8 g (0.1 mole) of a polyperfluoroether compound of the following formula

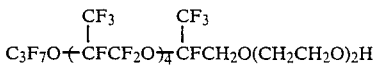

were charged into a 500 ml three-necked flask, followed by reaction in a tetrahydrofuran solvent in the presence of zinc powder at a temperature of from 70° to 80° C. for 10 hours. Thereafter, the tetrahydrofuran was removed by stripping under a reduced pressure of 30 mmHg at a temperature of 120° C., thereby obtaining a poly(perfluoropropylene glycol) group-containing organopolysiloxane of the following formula (D) in the form of a light yellow transparent liquid having a fluorine content of 32.5 wt %.

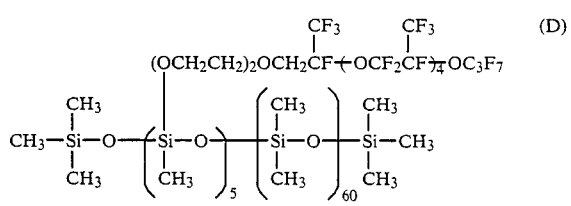

COMPARATIVE EXAMPLE 1

98.04 g (0.02 moles) of methylhydrogensiloxane and 47.0 g (0.1 mole) of a polyperfluoroether compound of the following formula

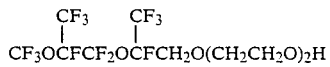

were charged into a 500 ml three-necked flask, followed by repeating the procedure of Example 4 to obtain a poly(perfluoropropylene glycol) group-containing organopolysiloxane of the following formula (E) in the form of a light yellow transparent liquid having a fluorine content of 17.0 wt %. This was provided as an antifoamer.

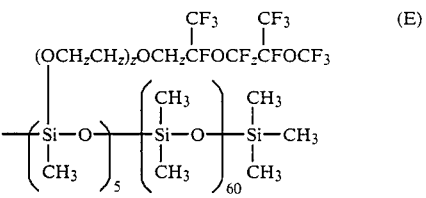

COMPARATIVE EXAMPLE 2

The amino group-containing organopolysiloxane (having a fluorine content of 0 wt %) used in Example 2 was provided as an antifoamer.

COMPARATIVE EXAMPLE 3

An acid fluoride of perfluoroether glycol (having a fluorine content of 68.7 wt %) was provided as an antifoamer.

Subsequently, 70 g of a 1,1,2-trichloroethane solution of 20 wt % (effective ingredient 4%) of a fluorine-based water and oil repellant [Scotch Guard FC-905 sold from Sumitomo 3M Co., Ltd. (20% perfluorooctylethylacrylate-2-ethylhexylacrylate copolymer solution in methyl chloroform)] was weighed in a 200 ml measuring cylinder with a stopper, to which each of the antifoamers obtained in Examples 1 to 4 and Comparative Examples 1 to 3 was added in amounts of 0.001 and 0.002 g. Within 30 seconds, the cylinder was shook 30 times by hand. Immediately after and 30 seconds after the shaking, the amount of foams was measured. The results are shown in Table 1.

TABLE 1

| | Amount of Foams (ml) | | | |
|---|---|---|---|---|
| | Antifoamer 15 ppm | | Antifoamer 30 ppm | |
| | Immediately after shaking | After 60 seconds | Immediately after shaking | After 60 seconds |
| Example: | | | | |
| 1 | 110 | 145 | 105 | 130 |
| 2 | 100 | 100 | 95 | 95 |
| 3 | 105 | 108 | 101 | 100 |
| 4 | 106 | 112 | 105 | 110 |
| Comparative Example: | | | | |
| 1 | 200< | 200< | 195 | 200< |
| 2 | 200< | 200< | 200< | 200< |
| 3 | 190 | 200< | 180 | 193 |

Further, 50 g of a foaming solution consisting of 2 wt % of calcium dodesylbenzenesulfonate, 3 wt % of cetanol, 1 wt % of water and 94 wt % of toluene was weighed in 500 ml measuring cylinder, to which 0.01 g of each of 1,1,2-trifluoro-1,1,2-trichloroethane solutions of 30% of the compounds of Example 1 to 4 and Comparative Examples 1 to 3 (60 ppm of each effective ingredient) was added. Air was continuously introduced into the solution at a rate of 1 liter/minute through a diffuser stone. The amount of foams was checked with time. The results are shown in Table 2 below.

TABLE 2

| | Amount of Foams (ml) | | | |
|---|---|---|---|---|
| Time | After 1 minute | After 3 minutes | After 5 minutes | After 10 minutes |
| Example: | | | | |
| 1 | 85 | 85 | 90 | 95 |
| 2 | 80 | 80 | 80 | 80 |
| 3 | 75 | 80 | 80 | 85 |
| 4 | 85 | 85 | 90 | 90 |
| Comparative Example: | | | | |
| 1 | 320 | 520 | 500< (4'10") | |
| 2 | 450 | 500< (1'30") | | |
| 3 | 150 | 380 | 620 | 500< (8'15") |

As will be apparent from the results of the Table 1 and 2, the antifoamers of the invention exhibit good foam-inhibiting and antifoaming effects on organic solvents containing hydrocarbon and fluorinated hydrocarbon surface active agents.

What is claimed is:

1. An antifoamer which comprises a polyperfluoroether group-containing organopolysiloxane comprising from 20 to 100 mole % of the polyperfluoroether group-containing organosiloxane units of the following formula (1)

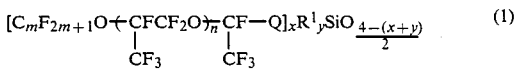

wherein Q represents a divalent organic group having from 1 to 40 carbon atoms and is

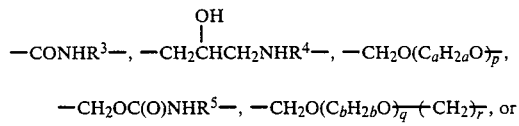

wherein $R^3$, $R^4$ and $R^5$ independently represent a divalent hydrocarbon group having from 1 to 10 carbon atoms, a and b are independently an integer of from 1 to 5, p and q are independently an integer of from 1 to 10, and r and t are independently an integer of from 2 to 5, $R^1$ is selected from the group consisting of a hydrogen atom, an unsubstituted monovalent hydrocarbon group having from 1 to 8 carbon atoms, a substituted monovalent hydrocarbon group having from 1 to 8 carbon atoms in which part or all of the hydrogen atoms bonded to the carbon atoms are substituted with a halogen atom, a cyano group, a chloromethyl group, a 3,3,3-trifluoropropyl group or a 2-cyanoethyl group, and a —OX group in which X represents a hydrogen atom or a monovalent hydrocarbon group having from 1 to 8 carbon atoms, m is an integer of from 1 to 14, n is an integer of 1 to 10, and x and y are $0 < x \leq 3$ and $0 \leq y \leq 3$ provided that $0 < x + y \leq 3$, the content of fluorine atoms in the polyperfluoroether group-containing organopolysiloxane being in the range of from 20 to 70% by weight.

2. The antifoamer according to claim 1, wherein said polyperfluoroether group-containing organosiloxane units are contained in said polyperfluoroether group-containing organopolysiloxane in an amount of from 30 to 70 mole %.

3. The antifoamer according to claim 1, wherein the content of fluorine atoms in the polyperfluoroether group-containing organopolysiloxane is in the range of from 30 to 60% by weight.

4. The antifoamer according to claim 1, wherein said polyperfluoroether group-containing organopolysiloxane further comprises siloxane units of the following general formula (2)

in which $R^2$ is selected from the group consisting of a hydrogen atom, or unsubstituted monovalent hydrocarbon group having from 1 to 8 carbon atoms and a substituted monovalent hydrocarbon group having from 1 to 8 carbon atoms in which part or all of the hydrocarbon atoms bonded to the carbon atoms are substituted with a halogen atom, a cyano group, a chloromethyl group, a 3,3,3-trifluoropropyl group or a 2-cyanoethyl group, and $0 < z \leq 3$.

5. The antifoamer according to claim 4, wherein said siloxane units are contained in an amount of up to 80 mole %.

6. The antifoamer according to claim 1, wherein said polyperfluoroether group-containing organopolysiloxane is dissolved in an insert organic solvent selected from the group consisting of a ketone or a halogen-containing compound in an amount of from 2 to 50% by weight.

7. The antifoamer according to claim 1, further comprising finely powdered silica serving to break foams.

8. The antifoamer according to claim 1, wherein said unsubstituted monovalent hydrocarbon group of $R^1$ and substituted monovalent hydrocarbon group of $R^1$ are each selected from the group consisting of an alkyl group, a cycloalkyl group, an alkenyl group, an aryl group and an aralkyl group.

9. The antifoamer according to claim 1, wherein said unsubstituted monovalent hydrocarbon group of $R^1$ and substituted monovalent hydrocarbon group of $R^1$ are each selected from the group consisting of a methyl group, an ethyl group, a propyl group, a butyl group, an octyl group, a cyclohexyl group, a vinyl group, an allyl group, a phenyl group, a tolyl group and a 2-phenylethyl group.

10. The antifoamer according to claim 4, wherein said unsubstituted monovalent hydrocarbon group of $R^2$ and substituted monovalent hydrocarbon group of $R^2$ are each selected from the group consisting of an alkyl group, a cycloalkyl group, an alkenyl group, an aryl group and an aralkyl group.

11. The antifoamer according to claim 4, wherein said unsubstituted monovalent hydrocarbon group of $R^2$ and substituted monovalent hydrocarbon group of $R^2$ are each selected from the group consisting of a methyl group, an ethyl group, a propyl group, a butyl group, an octyl group, a cyclohexyl group, a vinyl group, an allyl group, a phenyl group, a tolyl group and a 2-phenylethyl group.

12. The antifoamer according to claim 1, in which $R^3$, $R^4$ and $R^5$ are each selected from the group consisting of an alkylene group and a phenylene group.

13. The antifoamer according to claim 1, in which $R^3$, $R^4$ and $R^5$ are each selected from the group consisting of a methylene group and an ethylene group.

14. The antifoamer according to claim 6, wherein said organic solvent is selected from the group consisting of methyl ethyl ketone, methyl isobutyl ketone, 1,1,2-trifluoro-1,1,2-trichloroethane, hexafluoroxylene, hexafluoropropylene oligomers, 1,1,3-trichloroethane and 1,1,2,2-tetrachloroethylene.

15. The antifoamer composition according to claim 7, wherein the silica is present in an amount of less than 20 parts by weight, to 100 parts by weight of the organopolysiloxane.

16. The antifoamer composition according to claim 7, wherein the silica is present in an amount of less than 15 parts by weight, to 100 parts by weight of the organopolysiloxane.

* * * * *